US010807597B2

(12) United States Patent
Moriyama et al.

(10) Patent No.: US 10,807,597 B2
(45) Date of Patent: Oct. 20, 2020

(54) CONTROL DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Eiji Moriyama, Okazaki (JP); Kiyoshi Kurita, Anjo (JP); Kazuharu Asai, Nagoya (JP); Munenori Terada, Okazaki (JP); Makoto Sawada, Nissin (JP); Shinya Toyoda, Nissin (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/468,852

(22) PCT Filed: Nov. 14, 2017

(86) PCT No.: PCT/JP2017/040916
§ 371 (c)(1),
(2) Date: Jun. 12, 2019

(87) PCT Pub. No.: WO2018/123306
PCT Pub. Date: Jul. 5, 2018

(65) Prior Publication Data
US 2020/0055519 A1 Feb. 20, 2020

(30) Foreign Application Priority Data
Dec. 27, 2016 (JP) .................................. 2016-253530

(51) Int. Cl.
*B60W 10/02* (2006.01)
*B60W 10/06* (2006.01)
(Continued)

(52) U.S. Cl.
CPC .......... *B60W 30/18* (2013.01); *B60W 10/026* (2013.01); *B60W 10/06* (2013.01);
(Continued)

(58) Field of Classification Search
CPC .... B60W 10/02; B60W 10/026; B60W 10/06; B60W 10/107; B60W 30/18;
(Continued)

(56) References Cited

U.S. PATENT DOCUMENTS 6,217,469 B1 * 4/2001 Sawada ............. F16H 61/66272
474/13
6,223,118 B1 * 4/2001 Kobayashi ......... B60K 31/0008
701/96
(Continued)

FOREIGN PATENT DOCUMENTS

JP 2011-190819 A 9/2011
JP 2012-047254 A 3/2012
(Continued)

OTHER PUBLICATIONS

Feb. 13, 2018 International Search Report issued in International Patent Application No. PCT/JP2017/040916.

*Primary Examiner* — Edwin A Young
(74) *Attorney, Agent, or Firm* — Oliff PLC

(57) ABSTRACT

A control device that includes an electronic control unit that is configured to perform lock-up engagement pressure control for acceleration upon acceleration of a vehicle where vehicle speed is increased by increasing a rotational speed of the internal combustion engine, the lock-up engagement pressure control for acceleration controlling engagement pressure of the lock-up clutch, wherein in the lock-up engagement pressure control for acceleration, when an actual rotational speed of the input has reached greater than or equal to a reference rotational speed, the electronic (Continued)

control unit is configured to start engagement pressure increase control, the reference rotational speed being lower than a target rotational speed of the internal combustion engine, and the engagement pressure increase control increasing the engagement pressure of the lock-up clutch.

5 Claims, 5 Drawing Sheets

(51) Int. Cl.
*B60W 30/18* (2012.01)
*B60W 10/10* (2012.01)

(52) U.S. Cl.
CPC ......... *B60W 10/10* (2013.01); *B60W 2710/02* (2013.01); *B60W 2710/0644* (2013.01); *B60W 2710/1005* (2013.01)

(58) Field of Classification Search
CPC ............... B60W 30/188; B60W 30/20; B60W 2520/105; B60W 2710/024
See application file for complete search history.

(56) References Cited

U.S. PATENT DOCUMENTS

| | | | |
|---|---|---|---|
| 2013/0030675 A1* | 1/2013 | Minase | F02D 29/02 701/110 |
| 2015/0134215 A1 | 5/2015 | Kawaguchi et al. | |

FOREIGN PATENT DOCUMENTS

| | | |
|---|---|---|
| JP | 2013-245791 A | 12/2013 |
| WO | 2013/161718 A1 | 10/2013 |

* cited by examiner

FIG. 3

|  | C1 | C2 | B1 | D |
|---|---|---|---|---|
| First forward mode | ○ |  |  | ○ |
| Second forward mode |  | ○ |  |  |
| Backward mode |  |  | ○ | ○ |

CONTROL DEVICE

BACKGROUND

The present disclosure relates to a control device whose control target is a vehicle transmission device.

There has been used a vehicle transmission device including a fluid coupling having a lock-up clutch. For example, JP 2012-47254 A discloses a vehicle transmission device including a fluid coupling having a lock-up clutch and a transmission mechanism in a power transmission path connecting an internal combustion engine to wheels. For control of the vehicle transmission device, JP 2012-47254 A discloses that slip start control is performed in which the lock-up clutch is slip-engaged at the start of a vehicle (an example of when the vehicle is accelerated). JP 2012-47254 A describes that by performing the slip-start control, power transmission loss in the fluid coupling at the start of the vehicle is reduced, and a sudden increase in the rotational speed of the internal combustion engine is suppressed, enabling to improve fuel efficiency (see paragraph 0007).

In JP 2012-47254 A, lock-up clutch engagement control is performed after a lapse of a predetermined time from the start of the vehicle (see paragraph 0086). However, variations in the torque characteristics of the internal combustion engine or the performance of the fluid coupling may affect the change characteristics of the rotational speed of the internal combustion engine. For example, when an increase in the rotational speed of the internal combustion engine is faster than assumed, fuel efficiency may degrade due to a sudden increase in rotational speed, and drivability may degrade due to a reduction in rotational speed occurring thereafter. On the other hand, when an increase in the rotational speed of the internal combustion engine is slower than assumed, the rotational speed of the internal combustion engine is reduced due to the start of engagement of the lock-up clutch, and drivability may degrade.

SUMMARY

In a vehicle transmission device including a fluid coupling having a lock-up clutch and a transmission mechanism in a power transmission path connecting an internal combustion engine to wheels, it is desirable to be able to maintain excellent drivability regardless of variations in the torque characteristics of the internal combustion engine or the performance of the fluid coupling.

A control device according to the present disclosure is a control device whose control target is a vehicle transmission device including an input that is drive-coupled to an internal combustion engine; an output that is drive-coupled to wheels; a transmission input that is drive-coupled to the input through a fluid coupling having a lock-up clutch; and a transmission provided in a power transmission path connecting the transmission input to the output, the control device including: an electronic control unit that is configured to perform lock-up engagement pressure control for acceleration upon acceleration of a vehicle where vehicle speed is increased by increasing a rotational speed of the internal combustion engine, the lock-up engagement pressure control for acceleration controlling engagement pressure of the lock-up clutch, wherein in the lock-up engagement pressure control for acceleration, when an actual rotational speed of the input has reached greater than or equal to a reference rotational speed, the electronic control unit is configured to start engagement pressure increase control, the reference rotational speed being lower than a target rotational speed of the internal combustion engine, and the engagement pressure increase control increasing the engagement pressure of the lock-up clutch.

According to this configuration, by performing lock-up engagement pressure control for acceleration, even when the rotational speed of the transmission input increases according to vehicle speed upon acceleration of the vehicle, the rotational speed of the input can transition at a rotational speed close to the target rotational speed of the internal combustion engine. At that time, by setting the start timing of engagement pressure increase control of the lock-up clutch to when the actual rotational speed of the input has reached greater than or equal to the reference rotational speed lower than the target rotational speed of the internal combustion engine, adverse effects caused by the change characteristics of the rotational speed of the internal combustion engine can be eliminated. Thus, unlike the case of determining the timing with reference to elapsed time, the engagement pressure of the lock-up clutch can appropriately start to increase at timing at which the actual rotational speed of the input that gradually increases reaches the reference rotational speed, regardless of variations in the torque characteristics of the internal combustion engine or the performance of the fluid coupling. Thus, the rotational speed of the input smoothly transitions toward the target rotational speed of the internal combustion engine, enabling to maintain excellent drivability.

Further features and advantages of the technique according to the present disclosure will become clearer from the following description of illustrative and not-restrictive embodiments which are described with reference to drawings.

BRIEF DESCRIPTION OF THE DRAWINGS

FIG. 3 is an engagement table for the vehicle transmission device.

DETAILED DESCRIPTION OF EMBODIMENTS

An embodiment of a control device will be described with referenced to the drawings. A control device 1 of the present embodiment is a control device for a vehicle transmission device, whose control target is a vehicle transmission device 3 (hereinafter, simply referred to as a "transmission device 3"). The transmission device 3 of the present embodiment is basically formed as a continuously variable transmission device including a transmission mechanism 35 capable of performing stepless shifting in which the transmission gear ratio is changed steplessly.

Figure 1:
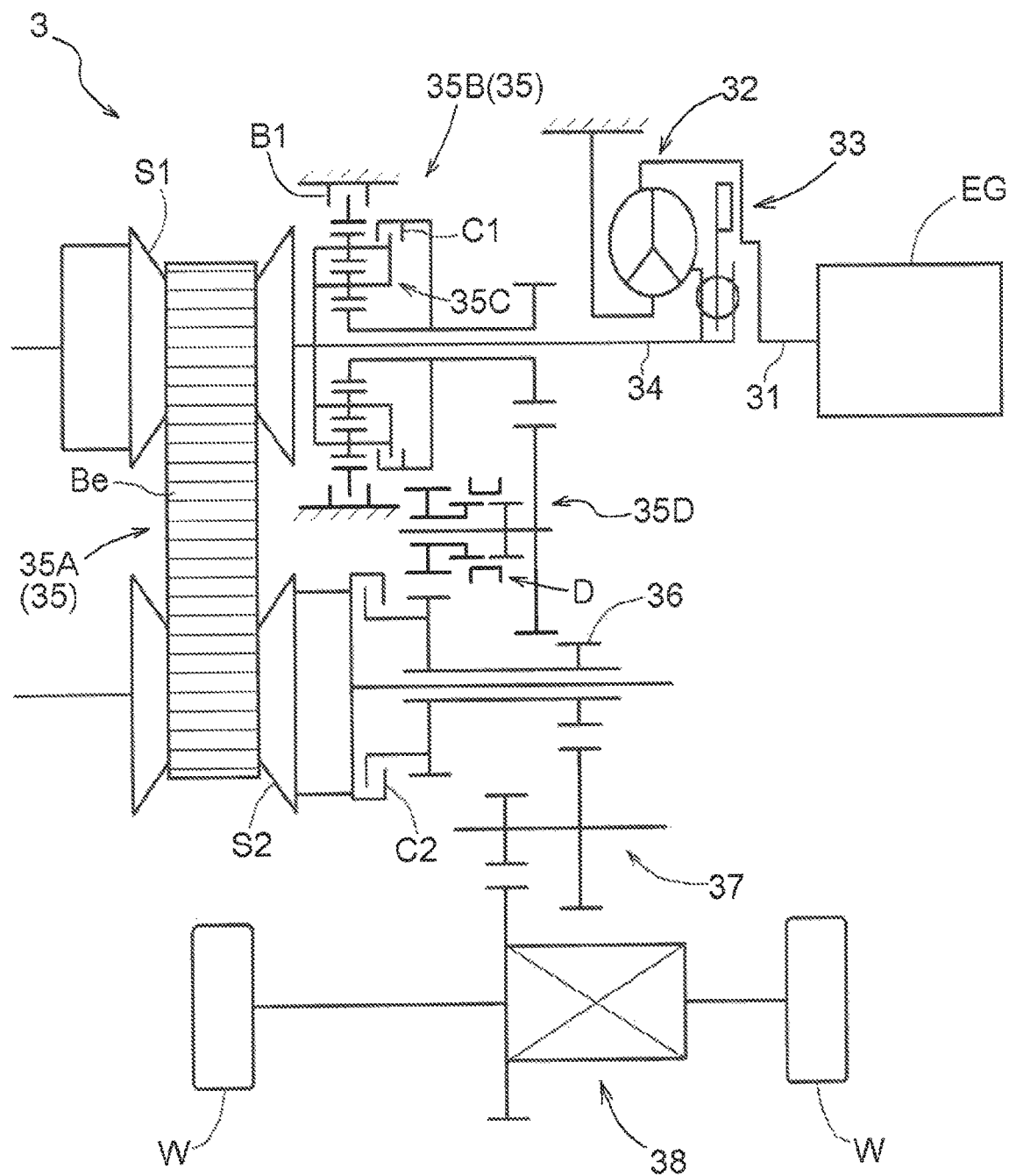
FIG. 1 is a schematic diagram of a vehicle transmission device according to an embodiment.

As shown in FIG. 1, the transmission device 3 includes an input member 31 (input), a fluid coupling 32 having a lock-up clutch 33, a transmission input member 34 (transmission input), the transmission mechanism 35 (transmission), and an output member 36 (output). The transmission mechanism 35 of the present embodiment is configured to include a continuously variable transmission mechanism 35A and a forward/backward switching mechanism 35B. In addition, the transmission device 3 includes a counter gear mechanism 37 and an output differential gear mechanism 38.

They are contained in a case (drive device case), the depiction of which is omitted.

The input member 31 is coupled to an internal combustion engine EG such that drive power can be transmitted (hereinafter, simply referred to as "drive-coupled"). The fluid coupling 32 is drive-coupled to the input member 31 and the transmission input member 34. The fluid coupling 32 of the present embodiment is, for example, a torque converter including a pump impeller which is drive-coupled to the input member 31, a turbine runner which is drive-coupled to the transmission input member 34, and a stator disposed therebetween. Note that the fluid coupling 32 may be a fluid coupling including only a pump impeller and a turbine runner. The fluid coupling 32 transmits torque of the internal combustion engine EG which is inputted to the input member 31, to the transmission input member 34 by hydraulic power transmission through hydraulic oil present therein, with the lock-up clutch 33 being in a disengaged state. On the other hand, with the lock-up clutch 33 being in an engaged state, torque of the internal combustion engine EG which is inputted to the input member 31 is directly transmitted to the transmission input member 34. As such, the transmission input member 34 is drive-coupled to the input member 31 through the fluid coupling 32 having the lock-up clutch 33.

Note that in the description of the present embodiment, the term "drive-coupled" refers to a state in which two rotating elements are coupled together such that drive power (the same meaning as torque) can be transmitted. This concept includes a state in which two rotating elements are coupled together such that they rotate together, and a state in which two rotating elements are coupled together such that drive power can be transmitted through one or more power transmission members. Such power transmission members include various types of members (shafts, gear mechanisms, belts, etc.) that transmit rotation at the same speed or at a changed speed, and may include engagement devices (friction engagement devices, mesh engagement devices, etc.) that selectively transmit rotation and drive power.

The transmission mechanism 35 is provided in a power transmission path connecting the transmission input member 34 to the output member 36. The transmission mechanism 35 changes the rotational speed of the transmission input member 34 serving as an input-side rotating member of the transmission mechanism 35, at a predetermined transmission gear ratio, and transmits the rotation to the output member 36 serving as an output-side rotating member. Here, the "transmission gear radio" is the ratio of the rotational speed of the transmission input member 34 to the rotational speed of the output member 36. The transmission mechanism 35 of the present embodiment includes the continuously variable transmission mechanism 35A and the forward/backward switching mechanism 35B which are provided in parallel to each other in the power transmission path connecting the transmission input member 34 to the output member 36.

The continuously variable transmission mechanism 35A of the present embodiment is formed as a belt-type continuously variable transmission mechanism. The continuously variable transmission mechanism 35A includes a first sheave S1, a second sheave S2, and a belt Be. The first sheave S1 is drive-coupled to the input member 31. The second sheave S2 is drive-coupled to the output member 36 through a second clutch C2. The belt Be runs over the first sheave S1 and the second sheave S2. The first sheave S1 and the second sheave S2 each have a movable sheave and a fixed sheave. The movable sheaves of the respective first sheave S1 and second sheave S2 include a hydraulic servo. By supplying hydraulic pressure to the hydraulic servos from a hydraulic control device 22, each movable sheave moves in an axial direction, and the groove width of a V-shaped groove of the first sheave S1 and the groove width of a V-shaped groove of the second sheave S2 each change. In this manner, the continuously variable transmission mechanism 35A continuously changes the effective diameter of each of the first sheave S1 and the second sheave S2, by which the rotation of the transmission input member 34 can be transmitted to the output member 36 side while the transmission gear ratio is changed steplessly.

Note that the maximum transmission gear ratio of the continuously variable transmission mechanism 35A is determined in proportion to the ratio of the maximum effective diameter of the first sheave S1 to the minimum effective diameter of the second sheave S2 which is obtained when the movable sheaves of the respective first sheave S1 and second sheave S2 move in their movable ranges. In addition, the minimum transmission gear ratio of the continuously variable transmission mechanism 35A is determined in proportion to the ratio of the minimum effective diameter of the first sheave S1 to the maximum effective diameter of the second sheave S2.

The forward/backward switching mechanism 35B of the present embodiment is formed as a gear type forward/backward switching mechanism. The forward/backward switching mechanism 35B of the present embodiment includes a differential gear mechanism 35C, a first clutch C1, a first brake B1, a reduction gear mechanism 35D, and a dog clutch D. The differential gear mechanism 35C is composed of a double-pinion planetary gear mechanism including a sun gear, a carrier, and a ring gear. The input member 31 is drive-coupled to the carrier, and the ring gear can be selectively fixed by the first brake B1. The sun gear serves as an output rotating element of the differential gear mechanism 35C, and is selectively drive-coupled to the carrier and the input member 31 by the first clutch C1. The differential gear mechanism 35C (the sun gear serving as the output rotating element) is drive-coupled to the output member 36 through the reduction gear mechanism 35D having the dog clutch D.

The forward/backward switching mechanism 35B transmits the rotation of the input member 31 directly to the output member 36 side with the first clutch C1 being in an engaged state, and thereby achieves a state (forward state) in which wheels W rotate in a forward direction. On the other hand, the forward/backward switching mechanism 35B reverses the rotation of the input member 31 and transmits the rotation to the output member 36 side with the first brake B1 being in an engaged state, and thereby achieves a state (backward state) in which the wheels W rotate in a backward direction. As such, the forward/backward switching mechanism 35B is configured to be able to switch between the forward state and the backward state. The forward/backward switching mechanism 35B can transmit, in each of the forward and backward states, the rotation of the transmission input member 34 to the output member 36 side while changing the rotational speed based on a predetermined fixed transmission gear ratio. The forward/backward switching mechanism 35B can be referred to as a "fixed-ratio transmission mechanism".

Note that the transmission gear ratio in the forward state of the forward/backward switching mechanism 35B is determined in proportion to the gear ratio of the reduction gear mechanism 35D (the ratio of the number of teeth on a first gear on the differential gear mechanism 35C side to the number of teeth on a second gear on the output member 36 side). In addition, the transmission gear ratio in the forward state of the forward/backward switching mechanism 35B is determined according to the gear ratio of the differential gear mechanism 35C (the ratio of the number of teeth on the ring gear to the number of teeth on the sun gear) and the gear ratio of the reduction gear mechanism 35D.

The transmission gear ratio in the forward state of the forward/backward switching mechanism 35B is set to a value larger than the maximum transmission gear ratio of the continuously variable transmission mechanism 35A. Hence, when looking at the whole transmission mechanism 35 including the continuously variable transmission mechanism 35A and the forward/backward switching mechanism 35B, the transmission mechanism 35 is configured to be able to perform both stepless shifting in which the transmission gear ratio is changed steplessly, and step shifting in which the transmission gear ratio is changed in a stepwise manner. The transmission mechanism 35 can perform stepless shifting in a state in which the rotation of the transmission input member 34 is transmitted to the output member 36 through the continuously variable transmission mechanism 35A, and can perform step shifting upon switching from a state in which the rotation of the transmission input member 34 is transmitted to the output member 36 through the forward/backward switching mechanism 35B to a state in which the rotation of the transmission input member 34 is transmitted to the output member 36 through the continuously variable transmission mechanism 35A.

The output member 36 is drive-coupled to a pair of the left and right wheels W through the counter gear mechanism 37 and the output differential gear mechanism 38.

Figure 2:
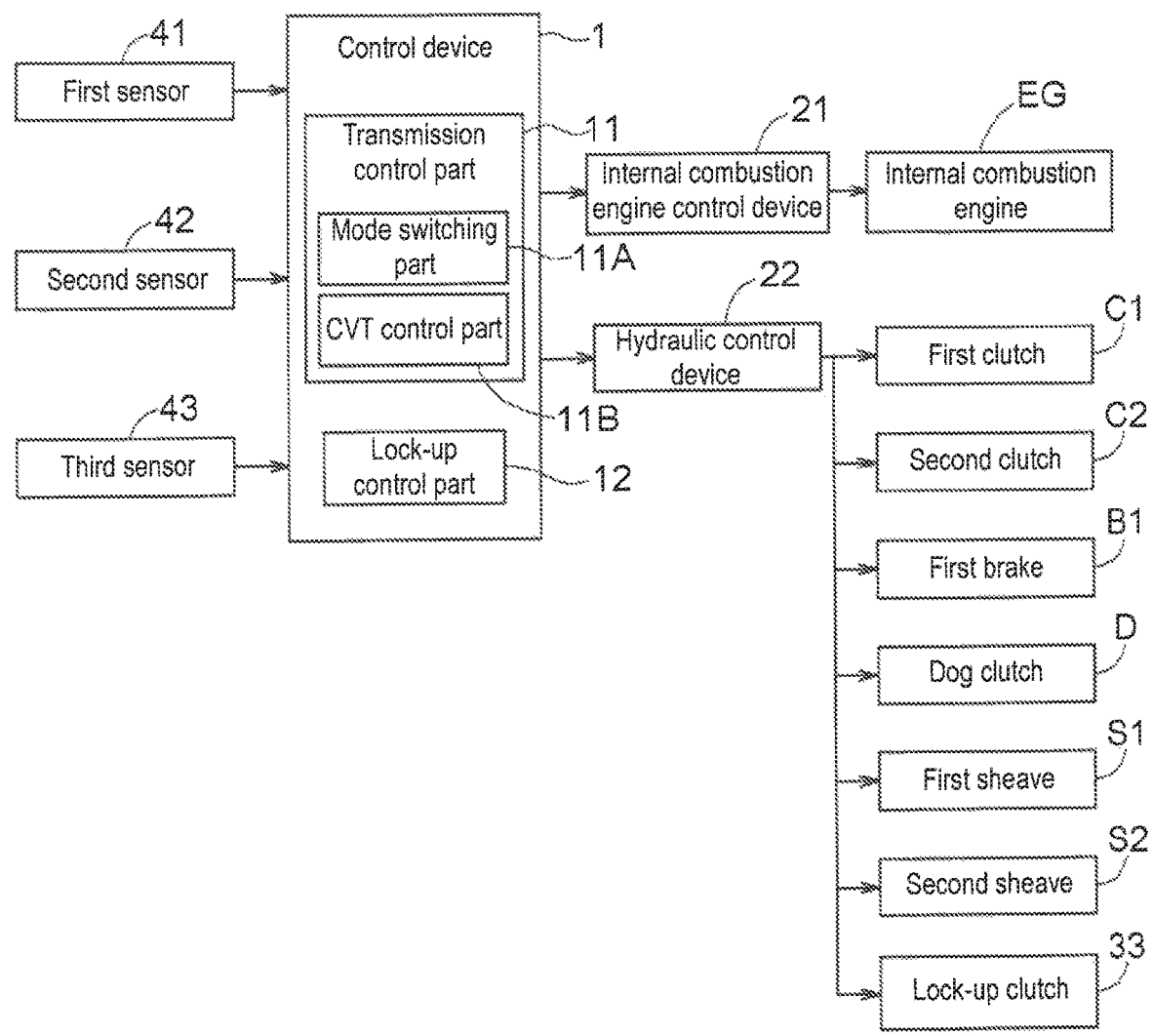
FIG. 2 is a block diagram of a control device.

The control device 1 that functions as the core to perform operation control of each part of the transmission device 3 includes, as shown in FIG. 2, a transmission control part 11 and a lock-up control part 12. The transmission control part 11 includes a mode switching part 11A and a CVT control part 11B. Each of those functional parts is composed of software (program) stored in a storage medium such as a memory, or separately provided hardware such as an arithmetic circuit, or both of them. The functional parts are configured to be able to pass information to each other. In addition, the control device 1 is configured to be able to obtain information on results of detection by various types of sensors (a first sensor 41 to a third sensor 43) provided in parts of a vehicle having the transmission device 3 mounted thereon.

The first sensor 41 detects the rotational speeds of the input member 31 and a member (e.g., the internal combustion engine EG) that rotates together with the input member 31. The second sensor 42 detects the rotational speeds of the transmission input member 34 and a member that rotates together with the transmission input member 34. The third sensor 43 detects the rotational speed of the output member 36 or the rotational speed of a member (e.g., the wheels W) that rotates in synchronization with the output member 36. The control device 1 can calculate vehicle speed based on a result of the detection by the third sensor 43. The control device 1 may be configured to be able to obtain various types of information, e.g., accelerator pedal position, the amount of brake operation, or the temperature of hydraulic oil, in addition to those described above.

The transmission control part 11 performs control to integrate, as the entire vehicle, various types of transmission control that are performed on the transmission mechanism 35 (the first clutch C1, the second clutch C2, the first brake B1, the dog clutch D, the first sheave S1, and the second sheave S2). The transmission control part 11 determines an operating mode to be implemented by the transmission mechanism 35, for example, based on sensor detection information (mainly, information on accelerator pedal position and vehicle speed). For example, a relationship between accelerator pedal position and vehicle speed and their corresponding operating mode is stored in a map format, etc., in the control device 1, and the transmission control part 11 determines the operating mode based on the map and the accelerator pedal position and vehicle speed obtained at that point in time.

In addition, the transmission control part 11 calculates vehicle required torque which is torque required to drive the vehicle, based on sensor detection information. In addition, the transmission control part 11 determines output torque (internal combustion engine request torque) which is requested to the internal combustion engine EG, based on the determined operating mode, sensor detection information, etc. Note that in the present embodiment, the control device 1 (transmission control part 11) is configured to be able to control the operating point (output torque and rotational speed) of the internal combustion engine EG through an internal combustion engine control device 21.

The mode switching part 11A controls the states of the respective first clutch C1, second clutch C2, first brake B1, and dog clutch D in order to implement the operating mode determined by the transmission control part 11. The mode switching part 11A controls hydraulic pressure supplied to hydraulic servos of the respective first clutch C1, second clutch C2, first brake B1, and dog clutch D, and thereby individually controls their engagement states. The hydraulic pressure supplied to each of the clutches C1, C2, and D and the brake B1 is controlled by the hydraulic control device 22 that operates in response to a hydraulic pressure instruction from the mode switching part 11A.

As shown in FIG. 3, the transmission device 3 of the present embodiment can implement a first forward mode, a second forward mode, and a backward mode. The first forward mode is implemented with the first clutch C1 and the dog clutch D being in an engaged state (and with other engagement devices being in a disengaged state; the same applies hereinafter). The first forward mode is a travel mode in which the rotation of the input member 31 is transmitted to the output member 36 and the wheels W through the forward/backward switching mechanism 35B that is in a forward state. The second forward mode is implemented with the second clutch C2 being in an engaged state. The second forward mode is a travel mode in which the rotation of the input member 31 is transmitted to the output member 36 and the wheels W through the continuously variable transmission mechanism 35A. The backward mode is implemented with the first brake B1 and the dog clutch D being in an engaged state. The backward mode is a travel mode in which the rotation of the input member 31 is transmitted to the output member 36 and the wheels W through the forward/backward switching mechanism 35B that is in a backward state. The first forward mode can be referred to as a "first travel mode", and the second forward mode can be referred to as a "second travel mode".

As described above, in the present embodiment, the transmission gear ratio in the forward state of the forward/backward switching mechanism 35B (the transmission gear ratio of the first forward mode) is set to be a value larger than the maximum transmission gear ratio of the continuously variable transmission mechanism 35A (the maximum transmission gear ratio of the second forward mode). Hence, in the present embodiment, the mode switching part 11A controls step shifting of the transmission mechanism 35 by controlling a mode transition from the first forward mode to the second forward mode. The mode switching part 11A allows the transmission mechanism 35 to perform step shifting by, for example, bringing the first clutch C1 and the dog clutch D that have been in an engaged state into a disengaged state, and bringing the second clutch C2 that has been in a disengaged state into an engaged state (or by other-way-around operation).

When the operating mode determined by the transmission control part 11 is the second forward mode, the CVT control part 11B adjusts the transmission gear ratio of the continuously variable transmission mechanism 35A. The CVT control part 11B adjusts the transmission gear ratio of the continuously variable transmission mechanism 35A by adjusting the groove width of the V-shaped groove of each of the first sheave S1 and the second sheave S2 by moving the movable sheaves in the axial direction by supplying hydraulic pressure to the hydraulic servos of the respective first sheave S1 and second sheave S2. The hydraulic pressure supplied to the first sheave S1 and the second sheave S2 is controlled by the hydraulic control device 22 that operates in response to a hydraulic pressure instruction from the CVT control part 11B.

The lock-up control part 12 controls the engagement state of the lock-up clutch 33. In the present embodiment, the lock-up clutch 33 is a hydraulically actuated friction engagement device capable of transmitting drive power by a friction force between two engaging members which are engaged with each other. Note that the first clutch C1, the second clutch C2, and the first brake B1 which are included in the transmission mechanism 35 are also similar friction engagement devices. The lock-up control part 12 controls the engagement state of the lock-up clutch 33 to an engaged state or a disengaged state. The hydraulic pressure supplied to the lock-up clutch 33 is controlled by the hydraulic control device 22 that operates in response to a hydraulic pressure instruction from the lock-up control part 12.

Note that the "engaged state" indicates a state in which transmission torque capacity is generated in the lock-up clutch 33 composed of a friction engagement device. The transmission torque capacity is maximum torque that the lock-up clutch 33 composed of a friction engagement device can transmit by friction. The magnitude of the transmission torque capacity is determined in proportion to pressure (engagement pressure) that presses a pair of engaging members (an input-side engaging member and an output-side engaging member) included in the lock-up clutch 33 against each other. The "engaged state" includes a "direct-coupling engaged state" in which there is no rotational speed difference (slip) between the pair of engaging members, and a "slip-engaged state" in which there is a rotational speed difference. The "disengaged state" indicates a state in which transmission torque capacity is not generated in the lock-up clutch 33 composed of a friction engagement device.

The lock-up control part 12 performs control to switch the engagement state (mainly, the direct-coupling engaged state/ disengaged state) of the lock-up clutch 33, for example, based on sensor detection information (mainly, information on accelerator pedal position and vehicle speed). For example, a relationship between accelerator pedal position and vehicle speed and their corresponding engagement state of the lock-up clutch 33 is stored in a map format, etc., in the control device 1, and the transmission control part 11 controls the lock-up clutch 33 to a direct-coupling engaged state or a disengaged state, based on the map and the accelerator pedal position and vehicle speed obtained at that point in time.

In addition, the lock-up control part 12 is configured to perform rotation-maintained engagement control specific to the present embodiment when step shifting is performed. The lock-up control part 12 performs rotation-maintained engagement control when the transmission mechanism 35 performs step shifting due to a mode transition from the first forward mode to the second forward mode. In the present embodiment, the transmission gear ratio for the first forward mode is set to be larger than the maximum transmission gear ratio for the second forward mode, and typically, the first forward mode is implemented at the start of the vehicle, and when the vehicle speed increases to some extent, the mode is switched to the second forward mode. Hence, the lock-up control part 12 performs rotation-maintained engagement control, for example, in a situation in which the vehicle accelerates after the start of the vehicle (upon acceleration of the vehicle where the vehicle speed is increased by increasing the rotational speed of the internal combustion engine EG). In addition, the lock-up control part 12 is configured to perform lock-up engagement pressure control for acceleration prior to the rotation-maintained engagement control upon acceleration of the vehicle.

In the rotation-maintained engagement control, the lock-up control part 12 controls the lock-up clutch 33 to a slip-engaged state, and controls the engagement pressure of the lock-up clutch 33 such that the rotational speeds of the input member 31 and the internal combustion engine EG follow a predetermined target rotational speed. It is preferred that the target rotational speed be set to a constant rotational speed. Note that the "constant" refers to no change over time, or a very small increase or a very small decrease that can be considered that there is substantially no change over time.

Figure 4:
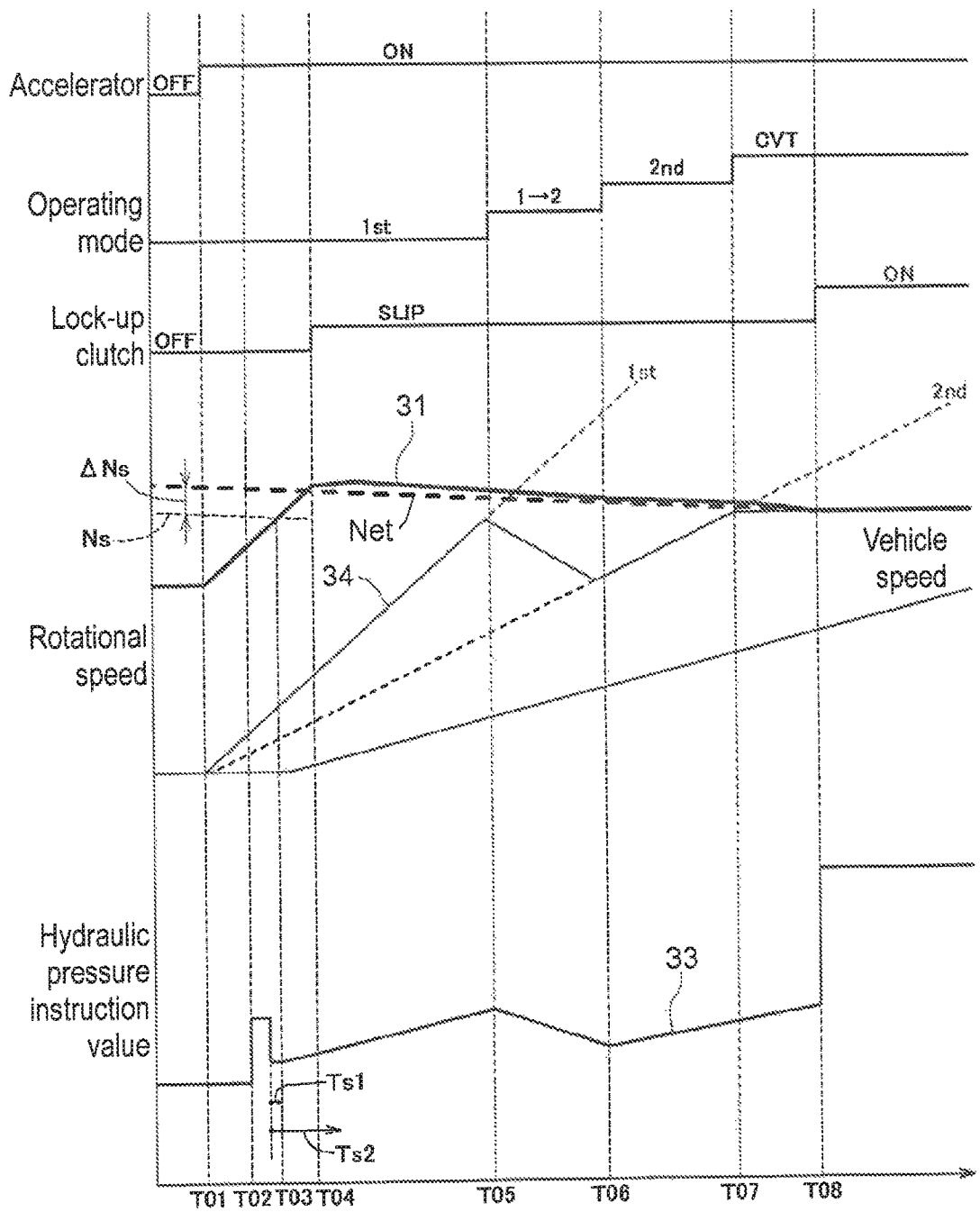
FIG. 4 is a time chart showing an example of rotation-maintained engagement control.

Here, upon acceleration of the vehicle, the rotational speed of the transmission input member 34 gradually increases (see time T01 to T05 of FIG. 4). To allow the rotational speeds of the input member 31 and the internal combustion engine EG to follow the constant target rotational speed in this state, the lock-up control part 12 performs lock-up engagement pressure control for acceleration. In the lock-up engagement pressure control for acceleration, the lock-up control part 12 controls the engagement pressure of the lock-up clutch 33. The lock-up control part 12 controls the engagement pressure of the lock-up clutch 33 such that a differential rotational speed between the rotational speed of the input member 31 and the rotational speed of the transmission input member 34 gradually decreases. Note that although FIG. 4 shows an example in which the differential rotational speed between the rotational speed of the input member 31 and the rotational speed of the transmission input member 34 decreases at a constant rate, the configuration is not limited thereto. For example, the differential rotational speed between the rotational speed of the input member 31 and the rotational speed of the transmission input member 34 may gradually decrease at different change rates for different times, or may gradually decrease stepwise. Alternatively, the differential rotational speed between the rotational speed of the input member 31 and the rotational speed of the transmission input member 34 may gradually decrease as a whole while repeating an increase and a decrease. In any case, in the lock-up engagement pressure control for acceleration, the lock-up control part 12 controls the engagement pressure of the lock-up clutch 33 such that the differential rotational speed between the rotational speed of the input member 31 and the rotational speed of the transmission input member 34 gradually decreases in each of the above-described fashions.

In the lock-up engagement pressure control for acceleration, the lock-up control part 12 first performs engagement preparation control in which oil with a predetermined standby pressure is supplied to a hydraulic oil chamber (not shown) of the lock-up clutch 33 to achieve a state in which generation of engagement pressure is just about to start in the lock-up clutch 33. The standby pressure is set to hydraulic pressure that provides a state in which, when oil is filled in the hydraulic oil chamber of the lock-up clutch 33, while a piston (not shown) of the lock-up clutch 33 strokes, there is still a gap between the input-side engaging member and the output-side engaging member. After the engagement preparation control, the lock-up control part 12 performs engagement pressure increase control in which the hydraulic pressure of oil supplied to the hydraulic oil chamber of the lock-up clutch 33 is increased from the standby pressure.

In the present embodiment, the lock-up control part 12 determines timing at which the hydraulic pressure supplied to the hydraulic oil chamber is increased from the standby pressure, based on the actual rotational speed of the input member 31 and the target rotational speed of the internal combustion engine EG. Specifically, when the actual rotational speed of the input member 31 has reached greater than or equal to a reference rotational speed Ns which is set to a value lower than the target rotational speed of the internal combustion engine EG, the lock-up control part 12 increases the engagement pressure of the lock-up clutch 33 by increasing the hydraulic pressure supplied to the hydraulic oil chamber from the standby pressure. Here, the target rotational speed of the internal combustion engine EG is set to a rotational speed (maximum efficiency rotational speed) at which maximum efficiency is achieved while the internal combustion engine EG outputs requested torque. The reference rotational speed Ns is set to a value lower than the maximum efficiency rotational speed by a set differential rotation ΔNs which is set taking into account the responsiveness of the lock-up clutch 33. The set differential rotation ΔNs can be set to, for example, a value on the order of 100 to 150 [rpm].

Furthermore, in the present embodiment, the lock-up control part 12 determines the timing at which the hydraulic pressure supplied to the hydraulic oil chamber is increased from the standby pressure, based also on standby time (elapsed time at the standby pressure). The lock-up control part 12 allows an increase in the hydraulic pressure supplied to the hydraulic oil chamber at least on a condition that the standby time has reached greater than or equal to a predetermined first set time Ts1. Namely, when the standby time has reached greater than or equal to the first set time Ts1 and the actual rotational speed of the input member 31 has reached greater than or equal to the reference rotational speed Ns, the lock-up control part 12 of the present embodiment increases the engagement pressure of the lock-up clutch 33 by increasing the hydraulic pressure supplied to the hydraulic oil chamber from the standby pressure. The first set time Ts1 may be experimentally found as the time required for the hydraulic pressure in the hydraulic oil chamber to be stabilized at the standby pressure, and set in advance.

Furthermore, the lock-up control part 12 is configured to increase the engagement pressure of the lock-up clutch 33 by increasing the hydraulic pressure supplied to the hydraulic oil chamber from the standby pressure, when, even if the actual rotational speed of the input member 31 is still less than the above-described reference rotational speed Ns, the standby time has reached greater than or equal to a predetermined second set time Ts2. The second set time Ts2 serving as a criterion of a guard timer may be, for example, experimentally found as the maximum value of the time required for the rotational speed of the input member 31 to reach the reference rotational speed Ns, and set in advance.

Thereafter, when the transmission mechanism 35 performs step shifting, the rotational speed of the transmission input member 34 that is determined according to the vehicle speed and transmission gear ratio obtained at that point in time (hereinafter, referred to as a "synchronous rotational speed") greatly changes before and after the step shifting (time T05 to T06). In such a case, too, the lock-up control part 12 controls the engagement pressure of the lock-up clutch 33 such that the rotational speeds of the input member 31 and the internal combustion engine EG follow the predetermined target rotational speed, regardless of the change in the rotational speed of the transmission input member 34. The lock-up control part 12 controls the engagement pressure of the lock-up clutch 33 such that the rotational speeds of the input member 31 and the internal combustion engine EG follow the constant target rotational speed, regardless of the change in the rotational speed of the transmission input member 34.

Figure 5:
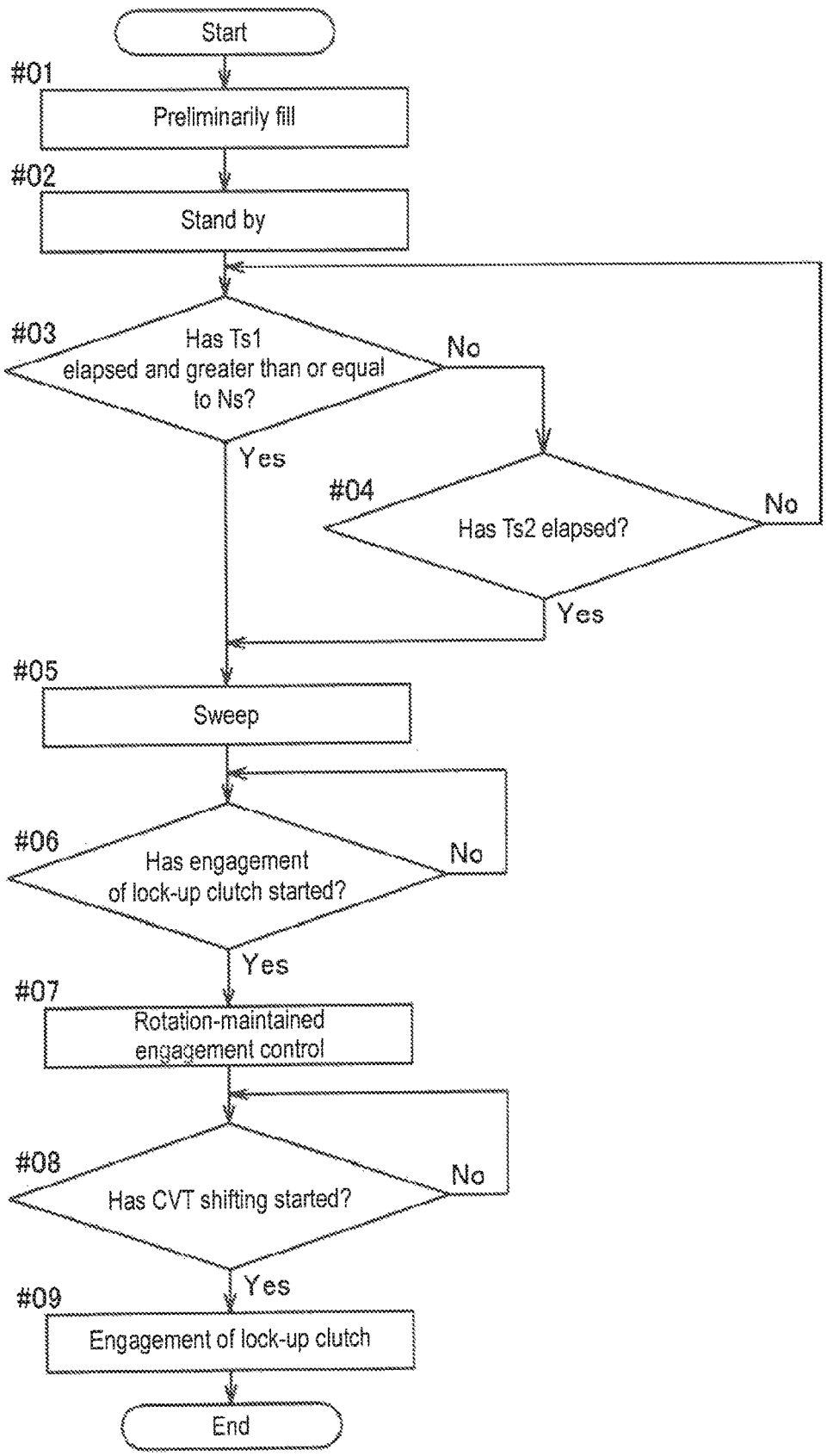
FIG. 5 is a flowchart showing an example of a processing procedure of the rotation-maintained engagement control.

The specific operation of rotation-maintained engagement control will be described with reference to a time chart of FIG. 4 and a flowchart of FIG. 5. After the vehicle starts by stepping on the accelerator (time T01), after a lapse of a predetermined time, high hydraulic pressure is preliminarily filled in the hydraulic servo (hydraulic oil chamber) of the lock-up clutch 33 (time T02 and step #01). Thereafter, the hydraulic pressure supplied to the hydraulic oil chamber is maintained at standby pressure, going into a standby state in a state in which generation of engagement pressure is just about to start in the lock-up clutch 33 (time T02 to the second half of time T03 and step #02). In the present embodiment, the processes at step #01 and #02 performed at the time T02 to T03 correspond to "engagement preparation control".

In this state, it is determined whether the standby time has reached greater than or equal to the first set time Ts1 and the actual rotational speed of the input member 31 has reached greater than or equal to the reference rotational speed Ns which is set to a value lower than the target rotational speed of the internal combustion engine EG (step #03). During a period during which the standby time is less than the first set time Ts1 or during a period during which the actual rotational speed of the input member 31 that gradually increases has not reached the reference rotational speed Ns (step #03: No), it is determined whether the standby time has reached the second set time Ts2 (step #04). Until the second set time Ts2 has elapsed (step #04: No), the magnitude relationship between the actual rotational speed of the input member 31 and the reference rotational speed Ns is continuously monitored. When the actual rotational speed of the input member 31 has finally reached the reference rotational speed Ns after standing by for the first set time Ts1 or more (step #03: Yes), the hydraulic pressure supplied to the hydraulic oil chamber of the lock-up clutch 33 gradually increases (step #05). In the present embodiment, when, even if the actual rotational speed of the input member 31 has not reached the reference rotational speed Ns, the standby time has reached the second set time Ts2 (step #04: Yes), the hydraulic pressure supplied to the hydraulic oil chamber of the lock-up clutch 33 gradually increases (step #05). In the present embodiment, the processes at step #03 to #05 performed before and after the time T03 correspond to "engagement pressure increase control".

Thereafter, while increasing the hydraulic pressure supplied to the lock-up clutch 33, it is determined whether the pair of engaging members of the lock-up clutch 33 has actually started to engage with each other (whether the lock-up clutch 33 has started to have transmission torque capacity) (step #06).

The determination as to whether engagement of the lock-up clutch 33 has started can be made, for example, based on a calculated value of shared torque of the lock-up clutch 33 obtained at that point in time. The shared torque of the lock-up clutch 33 is calculated based on internal combustion engine torque, pump torque which is determined from a capacity coefficient, and the inertia torque of the internal combustion engine EG. When the shared torque of the lock-up clutch 33, the internal combustion engine torque, the pump torque determined from a capacity coefficient, and the inertia torque of the internal combustion engine EG are represented using the symbols "Tc", "Te", "Tp", and "Ti", respectively, the shared torque Tc of the lock-up clutch 33 is calculated by:

$$Tc = Te - Tp + Ti.$$

Based on the start of an increase in the shared torque Tc of the lock-up clutch 33, it can be determined that engagement of the lock-up clutch 33 has started.

In the present embodiment, when it is determined that engagement of the lock-up clutch 33 has started (time T04 and step #06; Yes), rotation-maintained engagement control is performed from that point in time (step #07). In the rotation-maintained engagement control, the engagement pressure of the lock-up clutch 33 is controlled such that the rotational speeds of the input member 31 and the internal combustion engine EG follow a predetermined target rotational speed, regardless of a change in the rotational speed of the transmission input member 34. The target rotational speed of the input member 31 and the internal combustion engine EG can be set, for example, based on a predicted value of a synchronous rotational speed for the second forward mode which is scheduled to be implemented in the future. Namely, it is preferred to set the target rotational speed such that a transition of the target rotational speed has a comparable speed and slope to a synchronous predicted line for the future second forward mode.

The lock-up control part 12 determines target engagement pressure of the lock-up clutch 33 for implementing the set target rotational speed of the input member 31 and the internal combustion engine EG, and generates and outputs a hydraulic pressure instruction value corresponding to the target engagement pressure. The target engagement pressure of the lock-up clutch 33 is calculated based on target transmission torque capacity of the lock-up clutch 33. The target transmission torque capacity of the lock-up clutch 33 is calculated based on internal combustion engine torque, target pump torque, and the inertia torque of the internal combustion engine EG, and of those torque, the target pump torque is calculated based on a target capacity coefficient and the target rotational speed of the input member 31 and the internal combustion engine EG. When the target transmission torque capacity of the lock-up clutch 33, the internal combustion engine torque, the target pump torque, the inertia torque of the internal combustion engine EG, the target capacity coefficient, and the target rotational speed of the input member 31 and the internal combustion engine EG are represented using the symbols "Tct", "Te", "Tpt", "Ti", "Ct", and "Net", respectively, the target transmission torque capacity Tct of the lock-up clutch 33 is calculated by:

$$Tct = Te - Tpt + Ti$$
$$= Te - Ct \cdot \mathrm{Net}\wedge 2 + Ti.$$

Based on the calculated value, target engagement pressure of the lock-up clutch 33 for allowing the lock-up clutch 33 to generate transmission torque capacity equal to the target transmission torque capacity Tct is calculated. The lock-up control part 12 of the present embodiment performs feedforward control of the engagement pressure of the lock-up clutch 33 such that the engagement pressure of the lock-up clutch 33 reaches the target engagement pressure.

Furthermore, in the present embodiment, the lock-up control part 12 is configured to perform feedback control of the engagement pressure of the lock-up clutch 33 such that the actual rotational speed of the input member 31 actually follows the target rotational speed Net. The lock-up control part 12 performs feedback control of the engagement pressure of the lock-up clutch 33 such that based on a deviation between the actual rotational speed of the input member 31 which is obtained by the first sensor 41 and the target rotational speed Net and a predetermined gain, the deviation is canceled out. By thus using both feedforward control and feedback control, the actual rotational speed of the input member 31 can be allowed to follow the target rotational speed Net with excellent responsiveness.

By performing the rotation-maintained engagement control, during a period from time T04 to T05, in the first forward mode, the synchronous rotational speed increases with a relatively large slope along with the increase in vehicle speed, whereas the actual rotational speeds of the input member 31 and the internal combustion engine EG transition substantially constantly or in a very slightly decreased manner. During a period from time T05 to T06, the synchronous rotational speed decreases during performance of clutch-to-clutch shifting between the first clutch C1 and the second clutch C2 which is associated with the switching from the first forward mode to the second forward mode. During that period, the actual rotational speeds of the input member 31 and the internal combustion engine EG continue to transition substantially constantly or in a slightly decreased manner. During a period from time T06 to T07, in the second forward mode, with the transmission gear ratio of the continuously variable transmission mechanism 35A fixed at the maximum transmission gear ratio, the synchronous rotational speed increases with a smaller slope than that of the first forward mode along with the increase in vehicle speed. During that period, the actual rotational speeds of the input member 31 and the internal combustion engine EG continue to transition substantially constantly or in a slightly decreased manner. Note that in FIG. 4, in the second forward mode, a state in which the transmission gear ratio of the continuously variable transmission mechanism 35A fixed at the maximum transmission gear ratio is shown as "2nd" and a state in which the transmission gear ratio of the continuously variable transmission mechanism 35A changes steplessly is shown as "CVT" to distinguish therebetween.

Thereafter, the rotation-maintained engagement control is performed until at least stepless shifting has started to be performed in the second forward mode (step #08; Yes). In the present embodiment, the rotation-maintained engagement control is performed until a point in time when a rotational speed difference between the rotational speed of the transmission input member 34 and the rotational speed of the input member 31 has reached less than or equal to predetermined set differential rotation. The set differential rotation is set to a value (e.g., 20 to 100 [rpm], etc.) in a range of rotational speed differences where it can be considered that the transmission input member 34 and the input member 31 rotate in synchronization with each other.

When the transmission input member 34 and the input member 31 start to rotate in synchronization with each other (time T08), thereafter, the lock-up clutch 33 goes into a direct-coupling engaged state (step #09), and the rotation-maintained engagement control ends.

As described above, the control device 1 of the present embodiment performs rotation-maintained engagement control during a period from the time when engagement pressure has started to be generated in the lock-up clutch 33 until the transmission input member 34 and the input member 31 synchronize with each other. By performing the rotation-maintained engagement control, even when the transmission gear ratio of the transmission mechanism 35 changes in a stepwise manner upon switching from the first forward mode to the second forward mode, the change widths of the rotational speeds of the input member 31 and the internal combustion engine EG can be suppressed to a small value, regardless of a change in the rotational speed of the transmission input member 34.

Moreover, in the present embodiment, the target rotational speed Net of the input member 31 and the internal combustion engine EG for the rotation-maintained engagement control is set based on a synchronous predicted line for the future second forward mode. Hence, even before and after the time when, in the second forward mode, the transmission gear ratio of the continuously variable transmission mechanism 35A starts to decrease from the maximum transmission gear ratio and the lock-up clutch 33 is direct-coupling engaged, the change widths of the rotational speeds of the input member 31 and the internal combustion engine EG can be suppressed to a small value. Hence, the change widths of the rotational speeds of the input member 31 and the internal combustion engine EG can be suppressed to a small value, for example, over the entire period from when switching from the first forward mode to the second forward mode is performed at the start of the vehicle until furthermore, in the second forward mode, the transmission gear ratio of the continuously variable transmission mechanism 35A starts to change from the maximum transmission gear ratio.

Particularly, when, as in the present embodiment, the transmission mechanism 35 includes the continuously variable transmission mechanism 35A and the forward/backward switching mechanism 35B which are provided in parallel to each other and step shifting is performed by their coordination, too, it is less likely to make a passenger on the vehicle to get the feeling of step shifting. Thus, when stepless shifting is actually performed after performing step shifting, too, almost no feeling of shifting is given to the passenger on the vehicle, enabling to achieve excellent drivability at the start of the vehicle.

Furthermore, in the present embodiment, in lock-up engagement pressure control for acceleration performed prior to rotation-maintained engagement control, when, after engagement preparation control, the actual rotational speed of the input member 31 has reached greater than or equal to the reference rotational speed Ns, the engagement pressure of the lock-up clutch 33 increases. By setting timing at which the hydraulic pressure supplied to the hydraulic oil chamber is increased from standby pressure, with reference to the actual rotational speed, the engagement pressure of the lock-up clutch 33 can start to increase at appropriate timing, regardless of variations in the torque characteristics of the internal combustion engine EG or the performance of the fluid coupling 32. Thus, the rotational speed of the input member 31 smoothly transitions toward the target rotational speed of the internal combustion engine EG, enabling to maintain excellent drivability.

Other Embodiments (1) In the above-described embodiment, the setting of the reference rotational speed Ns is described by giving a specific example. However, the configuration is not limited thereto, and the reference rotational speed Ns may be set as appropriate, taking into account various requirements. The reference rotational speed Ns may be set, for example, according to the change rate of the rotational speed of the internal combustion engine EG. In this case, the reference rotational speed Ns may be set such that the difference (set differential rotation ΔNs) between the target rotational speed of the internal combustion engine EG and the reference rotational speed Ns increases as the change rate of the rotational speed of the internal combustion engine EG increases. Namely, if the change rate of the rotational speed of the internal combustion engine EG is relatively large, then the reference rotational speed Ns may be set to a lower value, and if the change rate of the rotational speed of the internal combustion engine EG is relatively small, then the reference rotational speed Ns may be set to a higher value in a range less than the target rotational speed of the internal combustion engine EG.

(2) In the above-described embodiment, the setting of the target rotational speed of the internal combustion engine EG is described by giving a specific example. However, the configuration is not limited thereto, and the target rotational speed of the internal combustion engine EG may be set as appropriate, taking into account various requirements.

(3) In the above-described embodiment, as an example, a configuration is described in which the continuously variable transmission mechanism 35A and the forward/backward switching mechanism 35B are provided in parallel to each other and the transmission gear ratio of the transmission mechanism 35 changes in a stepwise manner upon switching from the first forward mode to the second forward mode. However, the configuration is not limited thereto, and for example, the forward/backward switching mechanism 35B may be configured to be able to switch a plurality of shift speeds (a plurality of fixed transmission gear ratios) upon forward traveling, and the forward/backward switching mechanism 35B may be configured to be able to perform step shifting alone. In this case, the continuously variable transmission mechanism 35A and the forward/backward switching mechanism 35B may be provided in series with each other. In addition, the transmission mechanism 35 may be configured to include only the forward/backward switching mechanism 35B (stepped transmission mechanism) capable of switching a plurality of shift speeds, without including the continuously variable transmission mechanism 35A. In those configurations, too, by the control device 1 performing lock-up engagement pressure control for acceleration and rotation-maintained engagement control, excellent drivability can be maintained upon acceleration of the vehicle or upon step shifting.

(4) The configurations disclosed in the above-described embodiments (including the above-described embodiment and other embodiments; the same applies hereinafter) can also be applied in combination with configurations disclosed in other embodiments as long as a contradiction does not arise. For other configurations, too, the embodiments disclosed in the present description are in all respects illustrative, and modifications can be made thereto as appropriate without departing from the spirit and scope of the present disclosure.

Summary of the Embodiments

When the above description is summarized, a control device according to the present disclosure preferably has the following configurations.

In a control device (1) whose control target is a vehicle transmission device (3) including an input member (31) that is drive-coupled to an internal combustion engine (EG); an output member (36) that is drive-coupled to wheels (W); a transmission input member (34) that is drive-coupled to the input member (31) through a fluid coupling (32) having a lock-up clutch (33); and a transmission mechanism (35) provided in a power transmission path connecting the transmission input member (34) to the output member (36), lock-up engagement pressure control for acceleration is performed upon acceleration of a vehicle where vehicle speed is increased by increasing a rotational speed of the internal combustion engine (EG), the lock-up engagement pressure control for acceleration controlling engagement pressure of the lock-up clutch (33), and in the lock-up engagement pressure control for acceleration, when an actual rotational speed of the input member (31) has reached greater than or equal to a reference rotational speed (Ns), engagement pressure increase control starts, the reference rotational speed (Ns) being lower than a target rotational speed (Net) of the internal combustion engine (EG), and the engagement pressure increase control increasing the engagement pressure of the lock-up clutch (33).

According to this configuration, by performing lock-up engagement pressure control for acceleration, even when the rotational speed of the transmission input member (34) increases according to vehicle speed upon acceleration of the vehicle, the rotational speed of the input member (31) can transition at a rotational speed close to the target rotational speed (Net) of the internal combustion engine (EG). At that time, by setting the start timing of engagement pressure increase control of the lock-up clutch (33) to when the actual rotational speed of the input member (31) has reached greater than or equal to the reference rotational speed (Ns) lower than the target rotational speed (Net) of the internal combustion engine (EG), adverse effects caused by the change characteristics of the rotational speed of the internal combustion engine (EG) can be eliminated. Thus, unlike the case of determining the timing with reference to elapsed time, the engagement pressure of the lock-up clutch (33) can appropriately start to increase at timing at which the actual rotational speed of the input member (31) that gradually increases reaches the reference rotational speed (Ns), regardless of variations in the torque characteristics of the internal combustion engine (EG) or the performance of the fluid coupling (32). Thus, the rotational speed of the input member (31) smoothly transitions toward the target rotational speed (Net) of the internal combustion engine (EG), enabling to maintain excellent drivability.

In one aspect, it is preferred that the engagement pressure increase control be control performed after engagement preparation control in which oil with standby pressure is supplied to a hydraulic oil chamber of the lock-up clutch (33) to achieve a state in which generation of engagement pressure is just about to start in the lock-up clutch (33), the engagement pressure increase control increasing hydraulic pressure of oil supplied to the hydraulic oil chamber from the standby pressure.

According to this configuration, by performing engagement preparation control prior to engagement pressure increase control, after the actual rotational speed of the input member (31) has reached the reference rotational speed (Ns), the engagement pressure of the lock-up clutch (33) can start to increase at an early stage. Thus, engagement pressure increase control can be promptly performed at appropriate timing, enabling to maintain excellent drivability.

In one aspect, it is preferred that in the lock-up engagement pressure control for acceleration, when engagement pressure has actually started to be generated in the lock-up clutch (33), the engagement pressure of the lock-up clutch (33) be controlled such that a rotational speed of the input member (31) follows the target rotational speed (Net).

According to this configuration, by allowing the rotational speed of the input member (31) to follow, for example, the target rotational speed (Net) whose change over time is small, the change widths of the rotational speeds of the input member (31) and the internal combustion engine (EG) can be suppressed to a small value. Thus, excellent drivability can be maintained. In addition, even when, for example, the rotational speed of the transmission input member (34) greatly changes, excellent drivability can be maintained.

In one aspect, it is preferred that according to a change rate of the rotational speed of the internal combustion engine (EG), a difference between the target rotational speed (Net) of the internal combustion engine (EG) and the reference rotational speed (Ns) increase as the change rate increases.

According to this configuration, in a situation in which the rotational speed of the internal combustion engine (EG) suddenly increases, the engagement pressure of the lock-up clutch (33) starts to increase at timing at which the actual rotational speed of the input member (31) has reached the reference rotational speed (Ns) having a lower value due to the relationship with the target rotational speed (Net) of the internal combustion engine (EG). Thus, by setting the timing at which the engagement pressure starts to increase to a relatively earlier time, even when the rotational speed of the internal combustion engine (EG) suddenly increases, its overshoot is suppressed, enabling to maintain excellent drivability. On the other hand, in a situation in which the rotational speed of the internal combustion engine (EG) gently increases, the engagement pressure of the lock-up clutch (33) starts to increase at timing at which the actual rotational speed of the input member (31) has reached the reference rotational speed (Ns) having a higher value due to the relationship with the target rotational speed (Net) of the internal combustion engine (EG). Thus, by setting the timing at which the engagement pressure starts to increase to a relatively later time, even when an increase in the rotational speed of the internal combustion engine (EG) is delayed, a drop in rotational speed due to an increase in engagement pressure is suppressed, enabling to maintain excellent drivability. Namely, by adjusting a difference between the target rotational speed (Net) of the internal combustion engine (EG) and the reference rotational speed (Ns) according to the magnitude of the change rate of the rotational speed of the internal combustion engine (EG), the timing at which the engagement pressure of the lock-up clutch (33) starts to increase can be minutely adjusted, and consequently, excellent drivability can be maintained.

In one aspect, it is preferred that the transmission mechanism (35) include a continuously variable transmission mechanism (35) that steplessly changes a ratio of a rotational speed of the transmission input member (34) to a rotational speed of the output member (36), and the target rotational speed (Net) of the internal combustion engine (EG) be set to a rotational speed at which maximum efficiency is achieved while the internal combustion engine (EG) outputs requested torque.

According to this configuration, while fuel efficiency is enhanced by driving the internal combustion engine (EG) at a rotational speed at which maximum efficiency is achieved while requested torque is outputted, the vehicle can appropriately travel by absorbing a difference between the rotational speed of the transmission input member (34) and the rotational speed of the output member (36) by the continuously variable transmission mechanism (35).

The control device according to the present disclosure may be able to provide at least one of the above-described advantageous effects.

The invention claimed is:

1. A control device whose control target is a vehicle transmission device including an input that is drive-coupled to an internal combustion engine; an output that is drive-coupled to wheels; a transmission input that is drive-coupled to the input through a fluid coupling having a lock-up clutch; and a transmission provided in a power transmission path connecting the transmission input to the output, the control device comprising:
an electronic control unit that is configured to perform lock-up engagement pressure control for acceleration upon acceleration of a vehicle where vehicle speed is increased by increasing a rotational speed of the internal combustion engine, the lock-up engagement pressure control for acceleration controlling engagement pressure of the lock-up clutch,
wherein in the lock-up engagement pressure control for acceleration, when an actual rotational speed of the input has reached greater than or equal to a reference rotational speed, the electronic control unit is configured to start engagement pressure increase control, the reference rotational speed being lower than a target rotational speed of the internal combustion engine, and the engagement pressure increase control increasing the engagement pressure of the lock-up clutch.

2. The control device according to claim 1, wherein the engagement pressure increase control is control performed after engagement preparation control in which oil with standby pressure is supplied to a hydraulic oil chamber of the lock-up clutch to achieve a state in which generation of engagement pressure is just about to start in the lock-up clutch, the engagement pressure increase control increasing hydraulic pressure of oil supplied to the hydraulic oil chamber from the standby pressure.

3. The control device according to claim 1, wherein in the lock-up engagement pressure control for acceleration, when engagement pressure has actually started to be generated in the lock-up clutch, the engagement pressure of the lock-up clutch is controlled such that a rotational speed of the input follows the target rotational speed.

4. The control device according to claim 1, wherein according to a change rate of the rotational speed of the internal combustion engine, a difference between the target rotational speed of the internal combustion engine and the reference rotational speed increases as the change rate increases.

5. The control device according to claim 1, wherein
the transmission includes a continuously variable transmission that steplessly changes a ratio of a rotational speed of the transmission input to a rotational speed of the output, and
the target rotational speed of the internal combustion engine is set to a rotational speed at which maximum efficiency is achieved while the internal combustion engine outputs requested torque.

* * * * *